United States Patent
Steindl

(10) Patent No.: US 6,816,888 B2
(45) Date of Patent: Nov. 9, 2004

(54) COMMUNICATION PROCESS AND SYSTEM WITH SERVICE ACCESS POINTS AND GROUPS OF REFERENCES WHERE PARTICIPANT ADDRESSES ARE USED TO ACCESS A PARTICULAR REFERENCE

(75) Inventor: Guenter Steindl, Poppenricht (DE)

(73) Assignee: Siemens Aktiengesellschaft, Munich (DE)

(*) Notice: Subject to any disclaimer, the term of this patent is extended or adjusted under 35 U.S.C. 154(b) by 747 days.

(21) Appl. No.: 09/776,716

(22) Filed: Feb. 6, 2001

(65) Prior Publication Data

US 2001/0018705 A1 Aug. 30, 2001

Related U.S. Application Data

(63) Continuation of application No. PCT/EP99/05296, filed on Jul. 23, 1999.

(30) Foreign Application Priority Data

Aug. 6, 1998 (EP) .............................................. 98114800

(51) Int. Cl.⁷ ........................ G06F 15/167; H04L 12/28
(52) U.S. Cl. ...................................................... 709/213
(58) Field of Search ........................... 709/213; 370/351

(56) References Cited

U.S. PATENT DOCUMENTS 4,888,726 A    12/1989   Struger et al. .............. 709/201
5,644,754 A    7/1997    Weber et al. ................ 370/460
5,654,969 A    8/1997    Wilhelmsson ................ 703/24
5,845,086 A *  12/1998   Doebrich et al. ........... 709/238
6,192,036 B1 * 2/2001    Buhler et al. ................ 370/252
6,580,708 B1 * 6/2003    Choi ........................... 370/351

FOREIGN PATENT DOCUMENTS

| EP | 0 603 100 A2 |   | 6/1994 |
| WO | WO 96/10308  | * | 4/1996 |
| WO | WO 97/05552  | * | 2/1997 |

* cited by examiner

Primary Examiner—Glenn Gossage
(74) Attorney, Agent, or Firm—Sughrue Mion, PLLC

(57) ABSTRACT

A communication process and system for communicating between communication participants (S1, S2, S3, S4) that are provided for control and/or monitoring of a technological process, the communication participants connected in communication with each other by way of a bus system (B) and can be identified using their addresses. Each communication participant manages a first group of references as so-called service access points (SAPs), and for at least one of the service access points, a second group of references is managed. Access to an individual reference from this second group of references is carried out using the address of the accessing communication participant. A source address lookup table may be provided to convert participant addresses into a unique natural number corresponding to a particular reference.

13 Claims, 5 Drawing Sheets

COMMUNICATION PROCESS AND SYSTEM WITH SERVICE ACCESS POINTS AND GROUPS OF REFERENCES WHERE PARTICIPANT ADDRESSES ARE USED TO ACCESS A PARTICULAR REFERENCE

This is a Continuation of International Application PCT/EP99/05296, with an international filing date of Jul. 23, 1999, which was published under PCT Article 21(2) in German, and the disclosure of which is incorporated into this application by reference.

FIELD OF AND BACKGROUND OF THE INVENTION

The present invention relates to a communication process and apparatus for communication between communication participants. These communication participants are provided for control and/or monitoring of a technical process and are connected in communication with each other using a bus system, in particular a field bus, and can be identified using their addresses. In this process, each communication participant manages a first group of references as so-called service access points.

Communication system standard EN 50 170, Part I defines a model for managing received resources. This definition expands the source and target addresses of the associated communication participants and ultimately represents a reference that can be used to handle incoming and/or outgoing data unambiguously even with different communication relationships. IN the following, these expanded source and target addresses are designated as service access points (SAPS). For example, this means that the connection relationship which could previously be defined with the data of the sender and receiver (e.g., sender: station 1, receiver: station 3) is expanded in each case with the data for a service access point for the communication participants involved (e.g., sender: station 1.SAP3, receiver: station 3.SAP5). In this way, communication relationships to several other communication participants can be handled unambiguously for each communication participant in that each of theses communication relationships has a unique service access point made available to it.

In the majority of communication relationships, the service access points are specified implicitly through project planning for each communication relationship. In addition, there are also communication relationships in which the sender first sends a message to the potential receiver and receives an open service access point from the potential receiver as feedback. This open service access point can then be used to transfer data to the potential receiver. The actual message will then be sent to this receiver by way of the service access pint determined in this way.

However, since the number of service access points that are available per communication participant is limited, the number of possible connections that can be handled in this way is also limited by the number of service access points.

Usually, it is specified for each service access point which communication participant has the right to use that service access point. However, there can also be a specification for a service access point that it can be used by all the participating communication participants. Even if, at first glance, this increases the number of possible connections, the use of the same service access point by several communication participants in operation leads to intolerable problems.

For example, a first communication participant sends data over a service access point that is released to all communication participants and this communication participant immediately expects a response as a reaction to the data sent. This response will only be sent immediately after the data received if the response data is also immediately available. On the other hand, if the response data is not immediately available, the communication participant must inquire again at a later time as to whether the data is available. If, in the meantime, another communication participant attempts to access the same service access point, access will not be denied to it since the service access point is released to all communication participants. Instead, the data that was to be provided to the first communication participant will suddenly go to any communication participant that successfully accessed the service access point in the time between the original sending operation and the still pending receipt thereof.

OBJECTS OF THE INVENTION

Thus, it is an object of the present invention to provide a method and apparatus for expanding the connection resources that are available in a known communication process without impairing the quality and security and/or effectiveness of the communication.

SUMMARY OF THE INVENTION

These and other objects are achieved by a communication process and apparatus for communication between communication participants according to the invention. The communication participants are provided for control and/or monitoring of a technical process and are connected in communication with each other over a bus system. Each participant can be identified by an address. In the process defined by the invention, each communication participant manages a first group of references as service access points. They are managed in such a way that for at least one of the service access points a second group of references is managed, whereby access to an individual reference from this second group of references is carried out using the address of the accessing communication participant.

The first group of references (i.e. service access points) can be a group of so-called pointers, which point to a memory space that is available. Alternatively, they may comprise a field wherein each field element has a specific memory area available. In the communication process known from the above standard, the memory area that is referenced either by using the pointer or the field element can serve either directly as intermediate storage of the communication data or can contain an appropriate data structure that indicates memory areas for intermediate storage of the communication data.

The following will include a more detailed discussion of that arrangement in which the group of references is implemented as a group of pointers to memory areas. For example, if a total of five service access points are available, the resulting group of references comprises five pointers each pointing to a separate memory area. These memory areas may serve directly, or they may serve indirectly in that they reference the actual memory area by means of further pointers, in providing intermediate storage of incoming or outgoing communication data.

According to the invention, it is now provided that for at least one of the service access points, a second group of references is managed. The pointer corresponding to the service access point does not point directly to the memory area already described above. Instead, it points to a memory area which in turn, for example, contains another group of pointers. It is these further pointers that actually point to the memory areas described above. For example, if a transfer of data ensues to a first communication participant, having e.g. an address 1, by way of the service access point specified according to project planning with number 5, and the communication participant with the address 3 is sending the data, the fifth pointer (service access point 5) from the first group of references will be selected for intermediate storage of the data received. Additionally, the third pointer will be selected from the memory area that contains the second group of references, because the third pointer of this second group of references corresponds to the address 3 of the communication participant transferring the data.

Further characteristics, advantages and application possibilities of the invention will be evident from the claims, from the following description of exemplary embodiments illustrated in the figures, and from the figures themselves.

DETAILED DESCRIPTION OF THE PREFERRED EMBODIMENTS

Figure 1:
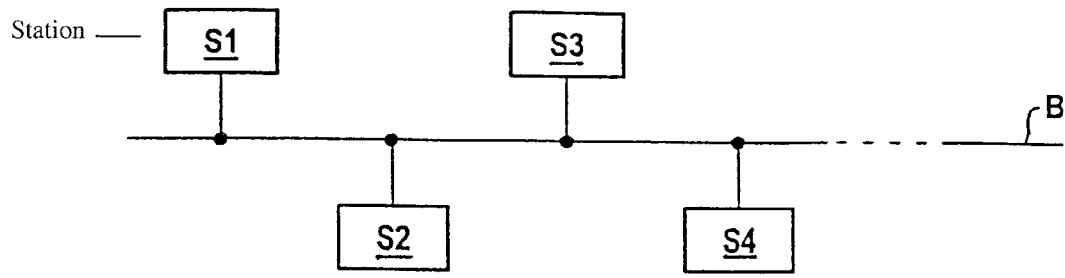
FIG. 1 shows a bus system with an exemplary number of communication participants.

FIG. 1 shows a bus system B with communication participants, or stations S1, S2, S3 and S4, connected to it. The communication participants—stations S1, S2, S3, S4—access the bus system B for communicating with each other. To do this, they use a protocol defined for communication over the bus system B. In the non-limiting exemplary embodiment, the protocol defined for the bus system is the so-called Profibus protocol, in particular Profibus-DP. EN 50 170, Part I, also relates to this protocol. Naturally, the invention can be implemented using other communication protocols.

Figure 2:
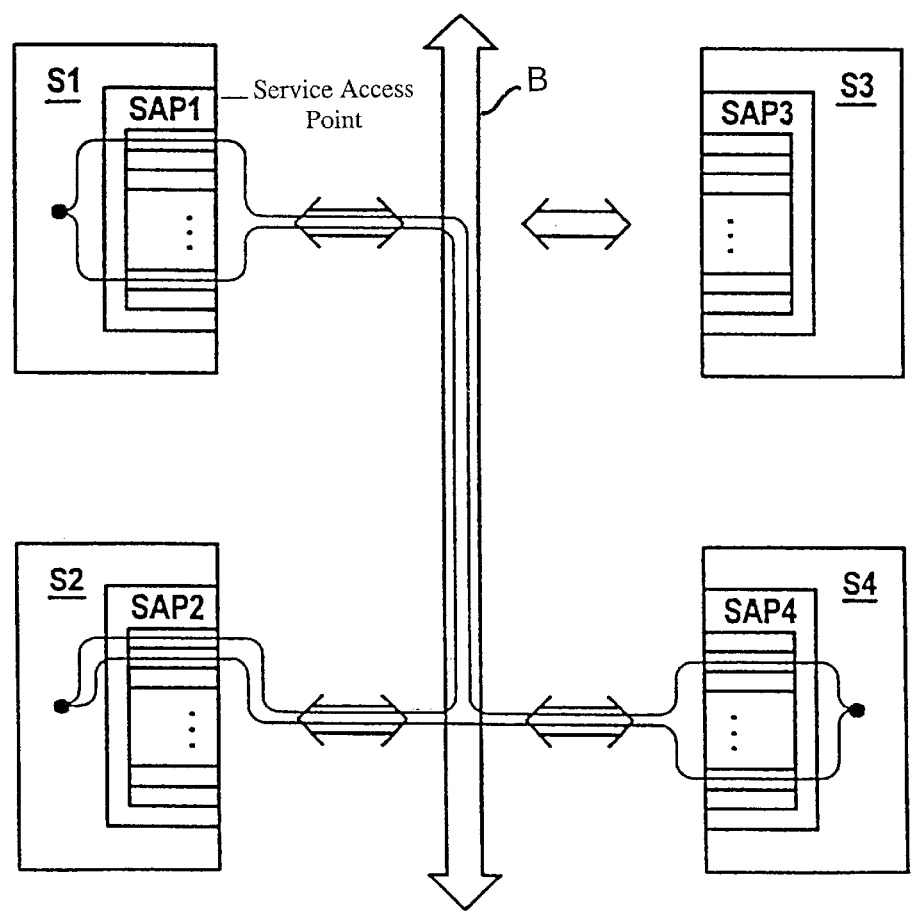
FIG. 2 shows another representation of the bus system and communication participants, including their service access point functionality.

FIG. 2 shows the communication participants or stations S1, S2, S3, S4 according to FIG. 1 in another representation. Each communication participant accesses the bus B for communication. To do this, accessing means are provided on the bus B for each communication participant, which are usually implemented in special ASICs (Application Specific Integrated Circuits). The functionality of the bus circuit, i.e. ASICs, implemented by software or firmware comprises, in particular, the functionality of the service access points i.e., SAP1, SAP2, SAP3, SAP4.

It was also described above that in the case of an inadequate number of service access points for all the communication relationships to be planned in the project, certain service access pints will be used by several and/or in particular by all the communication participants. The problems involved with this consist especially in that if a station S1 requests data from another station S4 and the data is not immediately available, the station S1 will have to inquire for the data gain at a later time. If, in the meantime, between the initial and the subsequent inquiries of the station S1, another station S2 accesses the service access pint of the requested station S4 that can be used by all communication participants, the data actually intended for the first station S1 erroneously goes to second station S2.

According to FIG. 2, there is a communication relationship from communication participant S1 to communication participant S4 and to communication participant S2. In other words, at least two communication relationships by the station S1 can remain differentiated by the selection of unique service access points. Specifically, in FIG. 2, the connection to communication participant S4 occurs by way of the first service access point of station S1. Completely analogous relationships result for the other communication participants S2 and S4 involved in the communication relationships.

It was also described above that in the case of an inadequate number of service access points for all the communication relationships to be planned in the project, certain service access points will be used by several and/or in particular by all the communication participants. The problems involved with this consist especially in that if a station S1 requests data from another station S4 and the data is not immediately available, the station S1 will have to inquire for the data again at a later time. If, in the meantime, between the initial and the subsequent inquiries of the station S1, another station S2 accesses the service access point of the requested station S4 that can be used by all communication participants, the data actually intended for the first station S1 erroneously go to second station S2.

Figure 3:
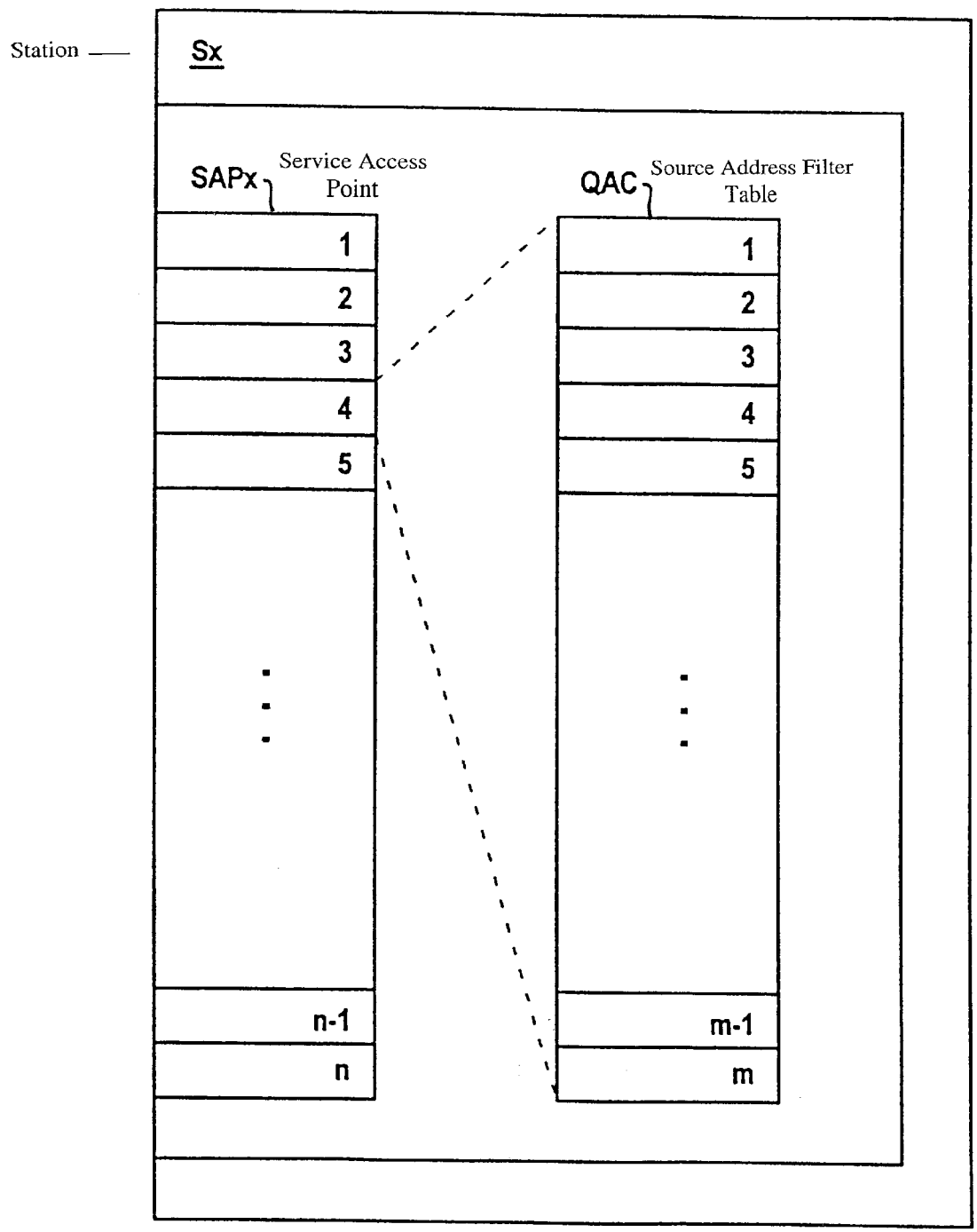
FIG. 3 depicts an expanded functionality of the service access points in accordance with the invention.

In order to avoid precisely this, a source address filter table QAC is assigned to each service access point, as shown in FIG. 3. Because of this, practically every individual service access point that already represents a type of "user compartment" because of its characteristic as a reference, will be divided again into another separate group of "user compartments." Each of these user compartments is assigned to the participating communication participant using the address of the communication participant and the corresponding user compartment number.

Thus, if according to FIG. 3, which shows the expanded functionality of e.g. the service access point 4 from FIG. 2, both station S1 and station S2 use the service access point 4 of station S4, all of the station S1 data will go into the user compartment with the number 1 and all data for station S2 will go into the user compartment with number 2. The process works in this way even if, as already explained above, the same service access point is used, namely service access point number 4.

This means that during communication with another communication participant using a previously specified or negotiated service access point, a first communication participant always accesses the user compartment with the number corresponding either directly to the station number of the first communication participant or one that can be assigned in some other way, e.g., with a uniquely defining correlations look-up table. Since no address collisions on the bus are tolerated, and, therefore, the addresses of the communication participants are always unambiguous, it is ensured that access to the user compartments occurs at all times free of conflict.

For example, the look-up table that may be provided could contain the addresses of the respective communication participants and assign to each of them a natural number from an increasing or decreasing numerical sequence, preferably starting with 0 (zero). On the other hand, often the addresses of the communication participants are coded in such a way that, by simple masking of leading bits from each station address, a natural number is obtained that can be interpreted directly as a user compartment number in the sense of this invention.

Figure 4:
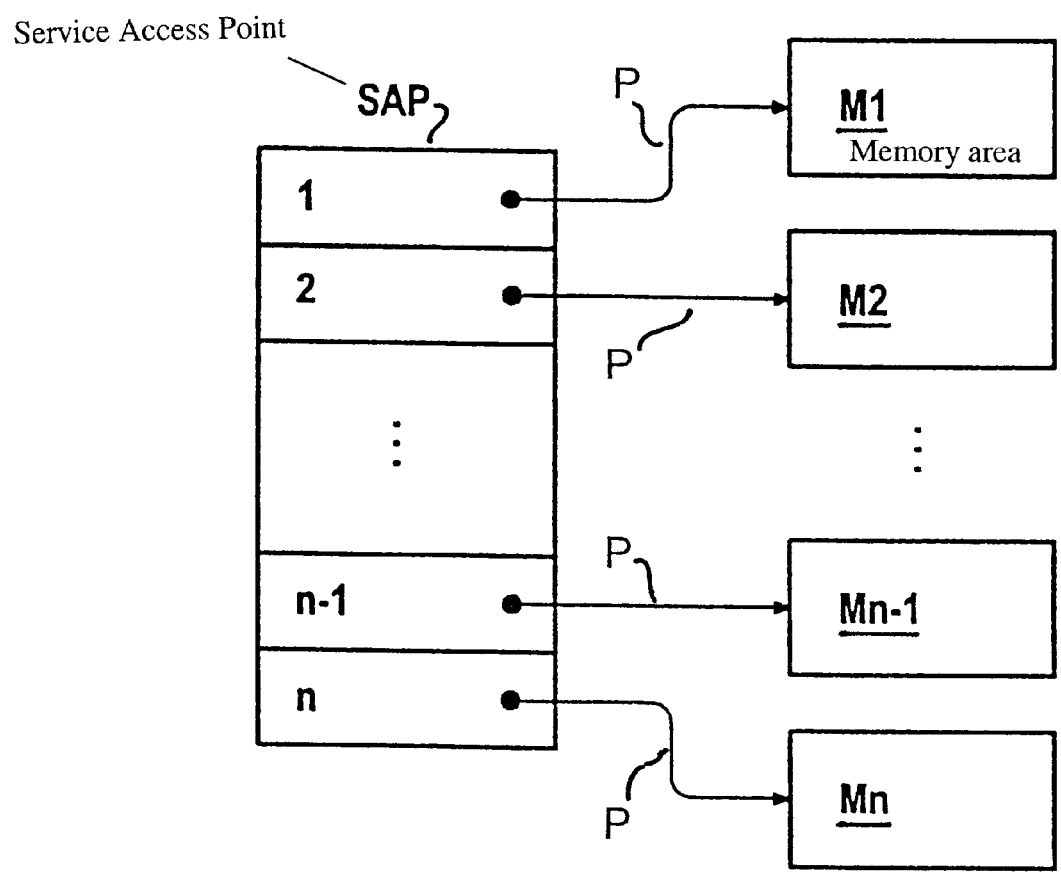
FIG. 4 shows one possible memory utilization for service access points.
Figure 5:
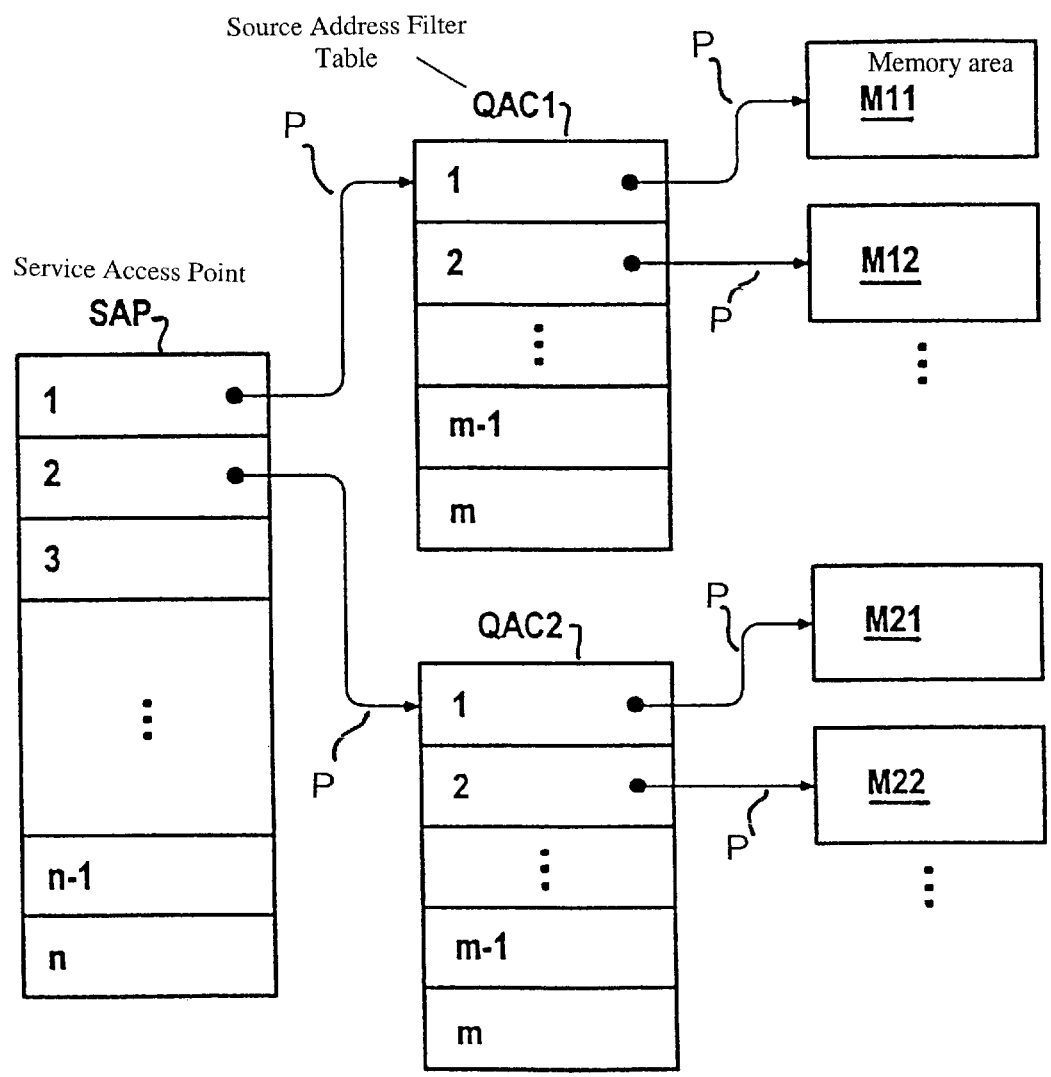
FIG. 5 shows a memory utilization embodiment according to the invention.

The relationships in the memory for each of the references designed as pointers are explained using FIGS. 4 and 5. However, first it should be emphasized again that the references do not necessarily have to be formed as pointers. This means it is also possible, for example, to define appropriate data structures in which access can be made directly to the individual components of the data structure using the respective designation.

FIG. 4 shows a possible memory utilization for the service access points, as discussed previously. The first group of references, indicated in FIG. 4 with the reference characters SAP, include a group of pointers P organized in a one-dimensional field. Using a field number, e.g., 2, access can be made to the respective service access point. The field number thus corresponds directly to a service access point. In the field that can be referenced under the respective number, there is at least one pointer to a memory area that is provided for intermediate storage of the communication data. This means that the pointer assigned to service access point 1 points to memory area M1, the pointer assigned to service access point 2 points to memory area M2, etc.

In contrast, FIG. 5 shows a possible utilization of the memory in the scope of a communication process according to the invention. Again the service access points are organized in one-dimensional fields that can be referenced using respective field numbers. Each of these fields has at least one pointer P, which, in contrast to the relationships shown in FIG. 4, points not directly to a memory area but to a table QAC for source address coding. If a communication participant with an address that corresponds directly or indirectly to the natural number 2 sends data to a communication participant that executes the communication process according to the invention, the data sent goes to the respective memory areas according to the scheme to be explained below.

According to the project planning, a service access point is provided for communication. It will be assumed that service access point 1 is used. A pointer is assigned to this service access point and points to the source address coding table QAC1. The address of the data transferring participant is 2 or corresponds to the number 2. Therefore, the element 2 is selected from the source address coding table QAC1. The pointer P of this element points to memory area M12. This memory area is available individually only for this communication process. Data from another communication participant, e.g., with the address 1, land in the memory area M11 that is completely separate from memory area M12.

Figure 6:
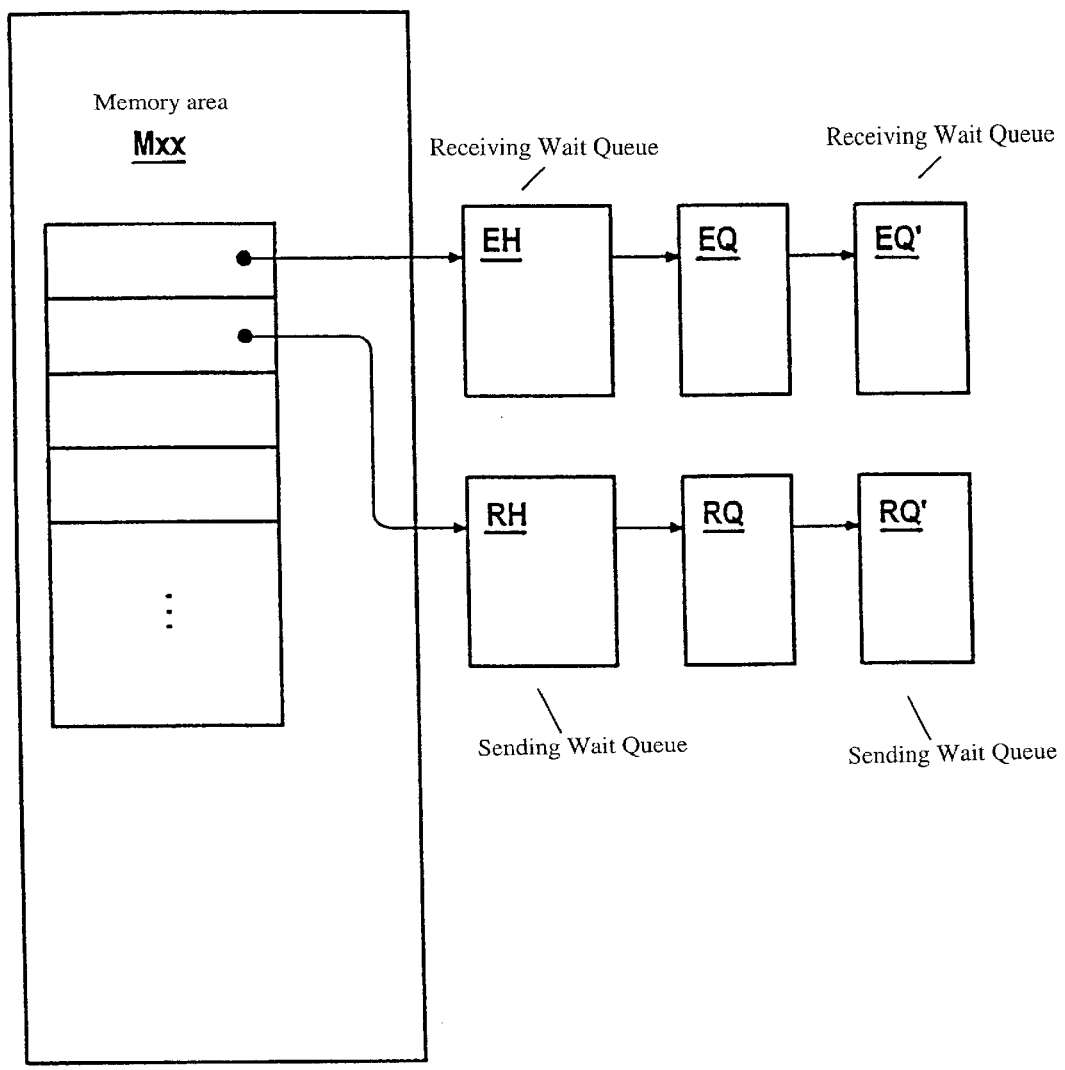
FIG. 6 shows yet another memory utilization embodiment.

Let it be noted that the respective memory areas M11, M12, . . . M21, M22, etc. are not necessarily used as memory that can be addressed in a linear manner. FIG. 6 shows a possible form of utilization of the memory areas. According to this, the memory area comprises at least one pointer to a receiving wait queue with a first element EH, i.e. the head element EH, of the receiving wait queue, and elements of the receiving wait queue EQ, EQ'. A sending wait queue. with the head of the sending wait queue RH and elements of the sending wait queue RQ and RQ' is managed completely analogously.

The unambiguous assignment capability created with the source address coding of data transferred over the bus, even with the use of one and the same access point, is particularly advantageous in the scope of lateral transmission. For this purpose, during lateral transmission, a service access point is used that is planned only for lateral transmission (however, lateral transmission is naturally possible for, or with, each service access point).

In the following, this service access point will be designated the lateral transmission service access point. The identification and coding of this lateral transmission service access point is specified in the message, so this service access point will always be used if the options of lateral transmission are to be used. Since a source address coding table is also assigned to this lateral transmission service access point, each message from a publisher in the scope of lateral transmission goes to a unique address in the memory that is specified by the lateral transmission service access point in connection with the source address of the publisher.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A communication process between a plurality of communication participants, comprising:

connecting said plurality of communication participants to a bus system, said communication participants being identified by respective participant addresses;

managing a first group of references as a plurality of service access points using said plurality of communication participants;

managing a second group of references for at least one of said service access points; and accessing a particular reference from said second group of references by way of an address corresponding to the participant address of the communication participant requesting access to said particular reference.

2. The communication process as recited in claim 1, wherein said plurality of communication participants are connected to said bus system for at least one of controlling and monitoring an automated process.

3. The communication process as recited in claim 1, wherein the management of said second group of references includes the use of a unique natural number that corresponds unambiguously to said particular reference.

4. The communication process as recited in claim 3, wherein the participant address of the communication participant requesting access corresponds unambiguously to the unique natural number corresponding to said particular reference.

5. The communication process as recited in claim 3, further comprising:

converting the participant address of the communication participant requesting access into the unique natural number corresponding to said particular reference.

6. The communication process as recited in claim 1, wherein each of said plurality of communication participants manages a single, respective one of said first group of references as one of said service access points, respectively.

7. The communication process as recited in claim 1, wherein each of said service access points has a single respective second group of said managed references.

8. A communication system comprising:

a plurality of communication participants;

a bus system connecting said plurality of communication participants, wherein said plurality of communication participants can communicate with each other via said bus system;

respective first groups of references that are managed as a plurality of service access points by said plurality of communication participants; and a second group of references that is managed for at least one of said service access points, wherein access to a particular reference from said second group of references by one of said plurality of communication participants is achieved using an address of said one communication participant requesting access to said particular reference.

9. The communication system as recited in claim 8, wherein each of said service access points has a respective second group of managed references.

10. The communication system as recited in claim 8, wherein the management of said second group of references includes the use of a unique natural number corresponding unambiguously to said particular reference.

11. The communication system as recited in claim 10, wherein said participant address of said one communication participant requesting access corresponds unambiguously to the unique natural number corresponding to said particular reference.

12. The communication system as recited in claim 10, further comprising an algorithm that correlates said participant address of said one communication participant requesting access to the unique natural number corresponding to said particular reference.

13. A method for communicating between communication participants over a bus system, comprising:

uniquely identifying each of the communication participants with a respective participant address;

providing each of the communication participants with a first group of references as respective service access points;

providing a second group of references for at least one reference of the first group of references; and within the second group of references, routing a communication from one of the communication participants in accordance with the participant address of the one communication participant.

* * * * *